(12) United States Patent
Harada et al.

(10) Patent No.: US 11,921,437 B2
(45) Date of Patent: Mar. 5, 2024

(54) CHARGING MEMBER AND ELECTROPHOTOGRAPHIC IMAGING APPARATUSES EMPLOYING THE SAME

(71) Applicant: Hewlett-Packard Development Company, L.P., Spring, TX (US)

(72) Inventors: Norihiro Harada, Suwon (KR); Jinmo Hong, Seongnam Si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/799,703

(22) PCT Filed: Mar. 3, 2021

(86) PCT No.: PCT/US2021/020710
§ 371 (c)(1),
(2) Date: Aug. 15, 2022

(87) PCT Pub. No.: WO2021/178564
PCT Pub. Date: Sep. 10, 2021

(65) Prior Publication Data
US 2023/0094342 A1     Mar. 30, 2023

(30) Foreign Application Priority Data
Mar. 6, 2020    (KR) .................. 10-2020-0028326

(51) Int. Cl.
*G03G 15/02*    (2006.01)
*G03G 15/06*    (2006.01)

(52) U.S. Cl.
CPC ....... *G03G 15/0233* (2013.01); *G03G 15/065* (2013.01)

(58) Field of Classification Search
None
See application file for complete search history.

(56) References Cited

U.S. PATENT DOCUMENTS

| | | | |
|---|---|---|---|
| 5,976,755 A | 11/1999 | Yoshida et al. | |
| 6,365,314 B1 | 4/2002 | Tomiyama et al. | |
| 9,026,012 B2* | 5/2015 | Otake | G03G 15/0812 399/276 |
| 9,316,958 B2* | 4/2016 | Kusano | G03G 15/1685 |
| 10,108,129 B2 | 10/2018 | Yamaguchi et al. | |
| 10,280,148 B2 | 5/2019 | Nishioka et al. | |
| 2006/0183615 A1 | 8/2006 | Eun et al. | |
| 2011/0177926 A1 | 7/2011 | Kusano et al. | |
| 2019/0265605 A1 | 8/2019 | Koga et al. | |
| 2019/0302644 A1 | 10/2019 | Yamada et al. | |

FOREIGN PATENT DOCUMENTS

| | | |
|---|---|---|
| EP | 1693715 A2 | 8/2006 |
| JP | 2006-293061 A | 10/2006 |
| JP | 2008-276025 A | 11/2008 |

* cited by examiner

*Primary Examiner* — Roy Y Yi
(74) *Attorney, Agent, or Firm* — Brooks, Cameron & Huebsch, PLLC

(57) ABSTRACT

A charging member may include a surface layer. The surface layer may include a urethane resin, an electron conducting agent, an azo-based metal complex compound, and a quaternary ammonium salt.

15 Claims, 2 Drawing Sheets

CHARGING MEMBER AND ELECTROPHOTOGRAPHIC IMAGING APPARATUSES EMPLOYING THE SAME

CROSS REFERENCE TO RELATED APPLICATIONS

This application is being filed as a PCT International Application filed in the U.S. Patent and Trademark Office (USPTO), which claims the priority benefit of Korean Patent Application No. 10-2020-0028326 filed in the Korean Intellectual Property Office (KIPO) on Mar. 6, 2020. The disclosure of Korean Patent Application No. 10-2020-0028326 is incorporated by reference herein in its entirety.

BACKGROUND

An electrophotographic image forming apparatus such as a laser printer or a copier includes a photoconductor and a charging roller, a developing roller, and a transfer roller, which are provided around the photoconductor. The charging roller charges the surface of the photoconductor to a predetermined voltage, and light emitted from an exposure unit forms an electrostatic latent image corresponding to print data on the charged surface of the photoconductor. The developing roller supplies a developer to the photoconductor to develop the electrostatic latent image into a developer image. The developer image such as a toner image is transferred by the transfer roller onto an image receiving member passing between the photoconductor and the transfer roller.

When an electrostatic latent image is formed, a contact charging method may be used in which a charging roller is directly contacted with the photoconductor to charge the surface of the photoconductor as an image carrier. In particular, a roller charging method using an electroconductive roller as a charging roller may be used in terms of charge stability. This method is a method of charging the surface of a photoconductor by applying a voltage to a conductive support (e.g. a shaft) using a charging roller to perform a microdischarge in the vicinity of a contact nip between the charging roller and the photoconductor, the charging roller having a structure in which a conductive elastic body layer is formed on the conductive support (e.g. a shaft) and a resistance layer is formed on the conductive elastic body layer.

DETAILED DESCRIPTION

Hereinafter, according to an example, a charging member for an electrophotographic image forming apparatus (hereinafter, simply may be referred to as 'charging member'), an electrophotographic image forming apparatus, and an electrophotographic cartridge including the charging member will be disclosed. The disclosure is not limited thereto. For example, the following disclosure may be equally applied to a charging member having a shape other than a roller, such as a corona charger or a charging brush.

In order to attain a charging member with a longer lifetime, the ability of a charging member to appropriately charge a photoconductor may be maintained for a longer time. However, in an ion-conductive charging member using an ion-conducting agent, an ion-conductive material is uniformly dispersed in a binder resin, and thus the non-uniformity of electric resistance value due to the dispersion non-uniformity of an electron-conducting agent may be reduced. However, the ion-conducting agent is easily influenced by usage environments. In particular, the electrical resistance value of the ion-conducting agent is likely to be increased under low-temperature and low-humidity environments, and conversely, the electrical resistance value thereof is may be decreased in high-temperature and high-humidity environments. When a large amount of the ion-conducting agent is added, the cations and anions constituting the ion-conducting agent may be polarized or the ion-conducting agent may exude to the surface of a conductive layer, and thus the electrical resistance value may change over time. Such a change in electrical resistance may influence the charging performance of a charging member and may cause image defects called background (BG) and micro-jitter (fine horizontal stripes) (M/J). Accordingly, in an electrophotographic image forming apparatus, a charging member may be designed to be capable of providing a high-quality image having no image defects such as background and micro-jitter or having a minimum of image defects because of charging performance and charging uniformity in low-temperature and low-humidity environments as well as in high-temperature and high-humidity environments. A charging member according to an example may include a conductive support, a conductive elastic body layer formed on the conductive support, and a surface layer formed on the conductive elastic body layer as the outermost layer.

Figure 1:
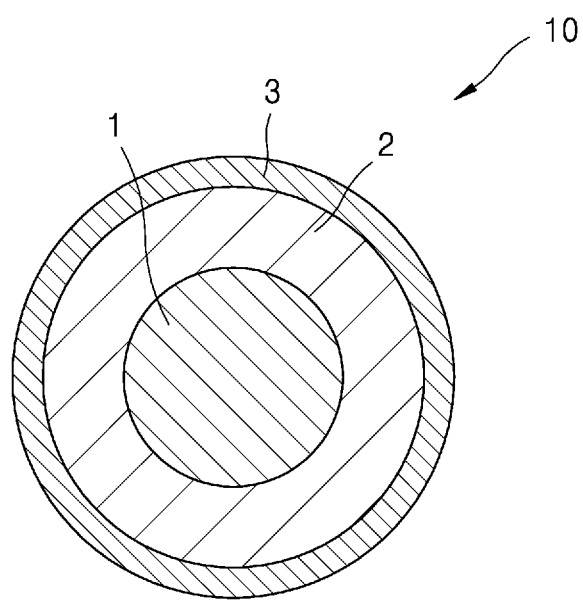
FIG. 1 is a cross-sectional view schematically illustrating a charging roller according to an example.

FIG. 1 is a cross-sectional view schematically illustrating a charging roller according to an example. Referring to FIG. 1, in a charging roller 10, a conductive elastic body layer 2 and a surface layer 3 are integrally laminated on the outer circumference surface of a conductive support 1 having a cylindrical shape in this order from the inner side toward the outer side in the diameter direction of the charging roller 10. An intermediate layer (not shown) such as a resistance adjustment layer for increasing voltage resistance (leak resistance) may be formed between the conductive elastic body layer 2 and the surface layer 3.

In a general image forming apparatus, the charging roller 10 shown in FIG. 1 is provided as a charging means for charging a body to be charged, and may function as a charging means for charging the surface of the photoconductor as an image carrier.

<Conductive Support 1>

The conductive support 1 may include a metal having electrical conductivity or may be made of the metal having electrical conductivity. As the conductive support, for example, a metallic hollow body (a pipe shape) or a metallic solid body (a rod shape) including iron, copper, aluminum, nickel, or stainless steel may be used. The outer circumference surface of the conductive support may be plated for the purpose of providing rust suppression or scratch resistance to a degree that does not impair electrical conductivity. Further, the outer circumference surface of the conductive support 1 may be coated with an adhesive, a primer, or the like in order to increase adhesion to the conductive elastic body layer. In this case, for sufficient electrical conductivity, this adhesive, primer, etc. in itself may be made electrically conductive.

The conductive support may have a cylindrical shape having a diameter of about 4 mm to about 20 mm, for example, about 5 mm to about 10 mm and having a length of about 200 mm to about 400 mm, for example, about 250 mm to about 360 mm.

<Conductive Elastic Body Layer 2>

The conductive elastic body layer 2 may exhibit elasticity suitable for securing uniform adhesion to the photoconductor. For example, the conductive elastic body layer 2 may be formed using at least one binder resin selected from natural rubbers; synthetic rubbers such as ethylene-propylene-diene monomer rubber (EPDM), styrene-butadiene rubber (SBR), a silicone rubber, a polyurethane-based elastomer, epichlorohydrin (ECO) rubber, isoprene rubber (IR), butadiene rubber (BR), acrylonitrile-butadiene rubber (NBR), hydrogenated NBR (H-NBR), and chloroprene rubber (CR); and synthetic resins such as an amide resin, an urethane resin, and a silicone resin. These may be used alone or in combination of two or more. In an example, as epichlorohydrin (ECO) rubber containing ethylene oxide (EO) residue in its molecule has ionic conductivity and is relatively low and stable in electrical resistance, the epichlorohydrin (ECO) rubber may be used as a binder resin. The conductive elastic body layer 2 may contain epichlorohydrin rubber, and may contain epichlorohydrin rubber as a main component. The conductive elastic body layer 2 may contain epichlorohydrin rubber in an amount of 50.0 wt % or more or 80.0 wt % or more.

The charging roller 10 may be in contact with a photoconductor (11 of FIG. 2) (contact developing method), and may be spaced apart from the photoconductor 11 (non-contact developing method).

In the case of an one-component contact developing method, the conductive elastic body layer 2 may be adjusted to have a hardness of 25 to 45 by an Asker-A TYPE durometer, and in the case of an one-component non-contact developing method, the conductive elastic body layer 2 may be adjusted to have a hardness of 40 to 65 by an Asker-A TYPE durometer. However, since hardness to be used is determined according to a printer speed, lifetime, cost, etc., it may vary depending on the developing method.

The conductive elastic body layer 2 may have a thickness of about 0.5 mm to about 8.0 mm, for example, about 1.25 mm to about 3.00 mm. Within the thickness range, the charging roller 10 exhibits elasticity, recovery sufficient against deformation, and stress imparted on toner may be reduced. In the case of the one-component non-contact developing method, the thickness of the elastic body layer 2 may be about 0.5 mm to 2.0 mm, and in the case of the one-component contact developing method, the thickness of the elastic body layer 2 may be about 1.5 mm to 8.0 mm.

The conductive elastic body layer 2 may include a conducting agent. The conducting agent to be included in the conductive elastic body layer may include at least one of an ion-conducting agent and an electron-conducting agent. The conductive elastic body layer 2 may include an ion-conducting agent in consideration of resistance stability. Since the ion-conducting agent is uniformly dispersed in a polymer elastic body to make the electrical resistance of the conductive elastic body layer 2 uniform, uniform charging may be obtained even when the charging roller 10 is charged using a DC voltage.

The ion-conducting agent to be used is not particularly limited, and may be appropriately selected depending on the purpose. Examples of the ion-conducting agent may include alkali metal salts, alkaline earth metal salts, and quaternary ammonium salts such as quaternary ammonium perchlorates, chlorates, hydrochlorides, bromates, iodates, hydroborates, sulfates, trifluoromethyl sulfates, sulfonates, and trifluoromethane sulfonates. These may be used alone or in combination of two or more. The alkali metal salts are not particularly limited, and may be appropriately selected depending on the purpose. Examples thereof may include lithium salts, sodium salts, and potassium salts. These may be used alone or in combination of two or more. Specific examples of the lithium salts may include $Li[B(C_{14}H_{10}O_3)_2]$, $Li(CF_3SO_2)_2N$, $Li(C_2F_5SO_2)_2N$, $LiClO_4$, $LiBF_4$, $LiPF_6$, $LiCF_3SO_3$, $LiAsF_6$, and $LiC_4F_9SO_3$.

Examples of the quaternary ammonium salts may include cationic surfactants such as lauryltrimethylammonium chloride, stearyltrimethylammonium chloride, octadecyltrimethylammonium chloride, didecyldimethylammonium chloride, hexadecyltrimethylammonium chloride, trioctylpropylammonium bromide, tetrabutylammonium chloride, and behenyltrimethylammonium chloride; amphoteric surfactants such as lauryl betaine, stearyl betatine, dimethyl lauryl betaine; and tetraethylammonium perchlorate, tetrabutylammonium perchlorate, and trimethyloctadecylammonium perchlorate, or the like.

The amount of the ion-conducting agent used may be in a range of about 0.01 parts by weight to about 10 parts by weight, or in a range of about 0.5 parts by weight to about 5 parts by weight, based on 100 parts by weight of the binder resin. These ion-conducting agents may be used alone or in combination of two or more.

The electron-conducting agent may be used in combination with the ion-conducting agent. As the electron-conducting agent, for example, carbon black may be used. Examples of carbon black i may include conductive carbon black such as oxidized carbon black for use in ink to improve dispersibility, ketjen black, and acetylene black; carbon black for rubber such as SAF, ISAF, HAF, FEF, GPF, SRF, FT, and MT grades; and pyrolytic carbon black, natural graphite, and artificial graphite. Further, as the electron-conducting agent, for example, metal oxides such as antimony-doped tin oxide, indium tin oxide (ITO), tin oxide, titanium oxide, zinc oxide; metals such as nickel, copper, silver, and germanium; electrically conductive polymers such as polyaniline, polypyrrole, and polyacetylene; and conductive whiskers such as carbon whisker, graphite whisker, titanium carbide whisker, conductive potassium titanate whisker, conductive barium titanate whisker, conductive titanium oxide whisker, and conductive zinc oxide whisker may be used. In order to ensure that a difference in electrical resistance is small and hardness is not high, An amount of the electron-conducting agent may be used. For example, the amount of the electron-conducting agent used may be in a range of about 30 parts by weight or less, for example, in a range of about 10 parts by weight or less, based on 100 parts by weight of the binder resin.

The resistance value of the elastic body layer 2 by the combination of the conducting agent may be adjusted to about $10^3\Omega$ to about $10^{10}\Omega$, and may be adjusted to about $10^4\Omega$ to about $10^8\Omega$. When the resistance value of the elastic body layer 2 is less than $10^3\Omega$, the charges on the photoconductor 11 may leak and thus an imbalance in electrical resistance occurs to cause spots on an image, or hardness increases to make uniform contact with the photoconductor 11 difficult, and image stains are easy to occur. When the resistance value of the elastic body layer 2 is more than $10^{10}\Omega$, background (B/G) image defects are easy to occur.

The conductive elastic body layer 2 may contain an additive such as a filler, a foaming agent, a crosslinking agent, a crosslinking accelerator, a lubricant, and an auxiliary agent, as needed. The crosslinking agent may include sulfur. The crosslinking accelerator may include tetramethylthiuram disulfide (CZ). The lubricant may include stearic acid. The auxiliary agent may include zinc oxide (ZnO).

<Surface Layer 3>

The surface layer 3 includes: a urethane resin as a binder resin; and an azo-based metal complex compound, a quaternary ammonium salt, and an electron conducting agent, which are dispersed or dissolved in the urethane resin.

The binder resin may form a matrix that occupies most of volume of the surface layer 3. The binder resin serves to bind an azo-based metal complex compound, a quaternary ammonium salt, an electron conducting agent, and other additives.

The binder resin may contain urethane resin or may be made of urethane resin. The urethane resin may be formed by a chain extension reaction of a polyol mixture of polyester polyol and polyether polyol with a polyisocyanate. Since polyester polyol and polyether polyol are used together, their respective properties may be used together.

The urethane resin formed by the chain extension reaction of a polyester polyol with a polyisocyanate has excellent wear resistance at relatively low hardness. However, since the urethane resin obtained by using a polyester polyol is often deteriorated at low temperature, when the urethane resin is used for a long period of time under low-temperature environments, electrical resistance varies, and thus background (B/G) images are easy to occur. Further, since an ester-based urethane is vulnerable to hydrolysis, when the ester-based urethane is used under high-temperature and high-humidity environments, its properties may change.

The urethane resin formed by the chain extension reaction of a polyether polyol with a polyisocyanate has excellent low-temperature flexibility, has relatively low electrical resistance, and thus has excellent stability. However, a polyester polyol and a polyether polyol have poor compatibility and may thus cause separation or curing failure. When a polyether polyol having an ethylene oxide (EO) content of about 60 wt % to about 90 wt % is used, the compatibility with a polyester polyol may be solved. The polyether polyol having an ethylene oxide (EO) content of about 60 wt % to about 90 wt % may have good compatibility with a polyester polyol. In addition, the surface layer 3, which may be a coating layer, produced using this urethane resin may have excellent low-temperature flexibility, relatively low electrical resistance, excellent stability, and excellent resistance stability at low hardness.

The surface layer 3 may include a urethane resin formed by a chain extension reaction of a polyol mixture of a polyester polyol and a polyether polyol having an ethylene oxide (EO) content of about 60 wt % to about 90 wt % with a polyisocyanate. The content ratio of a polyester polyol and a polyether polyol may be adjusted in a range of 8:2 to 2:8. When the content ratio of any one of the polyester polyol and polyether polyol is too low, improvement effects may become small.

As the polyester polyol, a polycaprolactam-based polyol, an adipic acid-based polyol, or the like may be used. The polyester polyol may be obtained by an esterification reaction between a compound having two or more hydroxyl groups and a polybasic acid, or may be obtained by a ring-opening addition reaction of cyclic esters such as ε-caprolactone, β-butyrolactone, γ-butyrolactone, γ-valerolactone, and δ-valerolactone using a compound having two or more hydroxyl groups as an initiator. Meanwhile, although polylactone-based polyols may be distinguished from polyester polyols, here, they are considered as a kind of the polyester polyols.

Examples of the aforementioned compound having two or more hydroxyl groups may include glycol compounds such as ethylene glycol, propylene glycol, 1,3-propanediol, 1,4-butanediol, 1,5-pentanediol, 1,6-hexanediol, diethylene glycol, triethylene glycol, tetraethylene glycol, dipropylene glycol, tripropylene glycol, 1,4-cyclohexanedimethanol; glycol compounds having a branched structure such as 2-methyl-1,5-pentane diol, 3-methyl-1,5-pentane diol, 1,2-butanediol, 1,3-butanediol, 2-butyl-2-ethyl-1,3-propanediol, 1,2-propane diol, 2-methyl-1,3-propanediol, neopentyl glycol, 2-isopropyl-1,4-butanediol, 2,4-dimethyl-1,5-pentane diol, 2,4-di ethyl-1,5-pentane diol, 2-ethyl-1,3-hexanediol, 2-ethyl-1,6-hexanediol, 3,5-pentanediol, and 2-methyl-1,8-octane diol; and trimethylol propane, trimethylol ethane, pentaerythritol, and sorbitol. These compounds may be used alone or in combination of two or more.

Among ester-based polyols, an ester-based polyol having a liquid phase at room temperature is easy to handle, is difficult to aggregate in a coating solution, and may not generate spots on an image, and is thus frequently used. Further, ester-based polyols having three or more hydroxyl groups may have a small amount of permanent deformation and good stability.

Examples of the aforementioned polybasic acid may include adipic acid, succinic acid, azeraic acid, sebacic acid, dodecanedicarboxylic acid, maleic acid, fumaric acid, 1,3-cyclopentanedicarboxylic acid, 1,4-cyclohexanedicarboxylic acid, and anhydrides thereof. These polybasic acids may be used alone or in combination of two or more.

As the polyether polyol having an ethylene oxide (EO) content of about 60 wt % to about 90 wt %, a bifunctional glycol or a trifunctional or more polyether polyol such as an ethylene oxide-polypropylene oxide copolymer may be used. the ethylene oxide-polypropylene oxide copolymer may be a random copolymer because hardness of the urethane resin may become low due to low crystallinity. The polyether polyol having an ethylene oxide (EO) content of about 60 wt % to about 90 wt % may be a polyether polyol produced by a random addition and/or block addition of alkylene oxides of 2 to 6 carbon atoms to the aforementioned compound having two or more hydroxyl groups. Examples of the polyether polyol may include polyoxyethylene polyoxypropylene polyol and polyoxyethylene polyoxytetramethylene polyol. For example, trifunctional or more polyoxyethylene polyoxypropylene polyols having an ethylene oxide residue at its molecular end obtained by random addition polymerization of ethylene oxide and propylene oxide may be used. Trifunctional or more polyoxyethylene polyoxypropylene polyols may be suitable in terms of suppressing of image defects occurrence in low-temperature and low-humidity environments, as compared with difunctional or less polyoxyethylene polyoxypropylene polyols.

As the polyisocyanate which undergoes chain-extension with the polyol mixture including a polyester polyol and a polyether polyol having an ethylene oxide (EO) content of about 60 wt % to about 90 wt %, toluene diisocyanate (TDI), diphenylmethane diisocyanate (MDI), isophorone diisocyanate (IPDI), hydrogenated diphenylmethane diisocyanate, hydrogenated toluene diisocyanate, or hexamethylene diisocyanate (HDI) may be used. Further, blocked polyisocyanates obtained by reacting HDI and a blocking agent has good storage stability because reactive isocyanate group may be blocked to inhibit a reaction at room temperature. As the blocking agent, for example, methyl ethyl ketone oxime having good storage stability and productivity and capable of adjusting dissociation temperature in a range of about 120° C. to about 160° C. When the blocking agent is dissociated by heating, an isocyanate group is regenerated, and thus the blocked polyisocyanate may react with a polyol.

The amount of polyisocyanate added may be adjusted such that the molar ratio ([NCO]/[OH]) of isocyanate (NCO) groups of polyisocyanate to total hydroxyl (OH) groups of the polyol mixture is in a range of about 12 to about 25. Polyether polyols may have a lower reactivity than that of polyester polyols, and it may leave unreacted reactants when the molar ratio is less than 12, and may deteriorate low-temperature flexibility when the molar ratio is more than 25.

The surface layer 3 may contain a small amount of other resin components in addition to the urethane resin for the purpose modifying the surface layer 3. As the other resin components, a silicone graft polymer, silicone oil, an acrylic resin, or a fluorine resin may be used for the purpose of improving the stain resistance of the surface.

The surface layer 3 may further include an azo-based metal complex compound and a quaternary ammonium salt, which are dispersed or dissolved in the urethane binder resin, as an ion-conducting agent.

The azo-based metal complex compound may be a compound represented by Formula (1) below. This compound has high ability of charging a photoconductor and high charging uniformity.

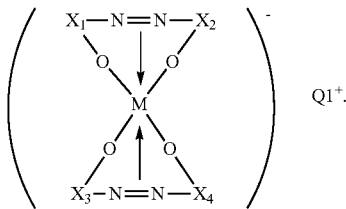

Formula (1)

In Formula (1) above, $X_1$, $X_2$, $X_3$, and $X_4$ each independently represent a substituted or unsubstituted phenylene group, a substituted or unsubstituted naphthalenylene group, or a substituted or unsubstituted pyrazolenylene group, M represents Fe, Cr, or Al, and $Q1^+$ represents a monovalent cation.

When the phenylene group, naphthalenylene group or pyrazolenylene group is substituted, the substituent thereof may be an alky group of 1 to 12 carbon atoms, for example, 1 to 6 carbon atoms, a nitro group, a halogen atom, an anilide group which may have a substituent, or a phenyl group which may have a substituent. The anilide group and phenyl group may each independently have an alky group of 1 to 12 carbon atoms, for example, 1 to 6 carbon atoms, or a halogen atom.

In Formula (1), specific examples of the monovalent counterion $Q1^+$ may include $H^+$; an alkali metal ion such as $Li^+$, $Na^+$ and $K^+$; $NH_4^+$ or an alkylammonium ion; and mixed ions thereof.

Specific examples of the azo-based metal complex compound represented by Formula (1) may be those represented by Formulae (AZO-1), (AZO-2), and (AZO-3) below. The compound represented by (AZO-1) may be commercially available from Hodogaya Chemical Co., Ltd. as the trade name SPILON BLACK TRH, the compound represented by (AZO-2) may be commercially available from Orient Chemical Co., Ltd. as the trade name BONTRON S-34, and the compound represented by (AZO-3) may be commercially available from Hodogaya Chemical Co., Ltd. as the trade name T-77. In Formulas (AZO-3), the sum of a, b and c is 1.

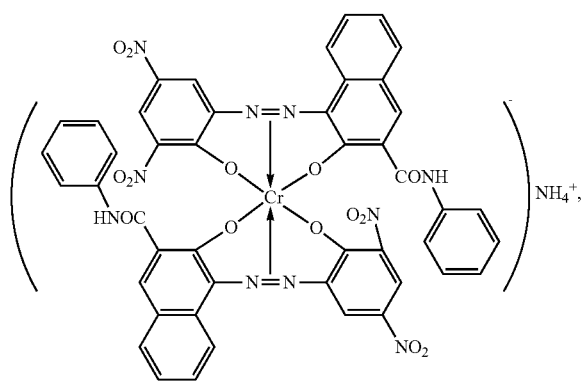

Formula (AZO-1)

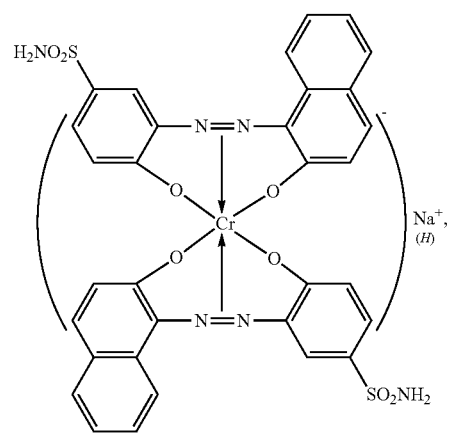

Formula (AZO-2)

-continued

Formula (AZO-3)

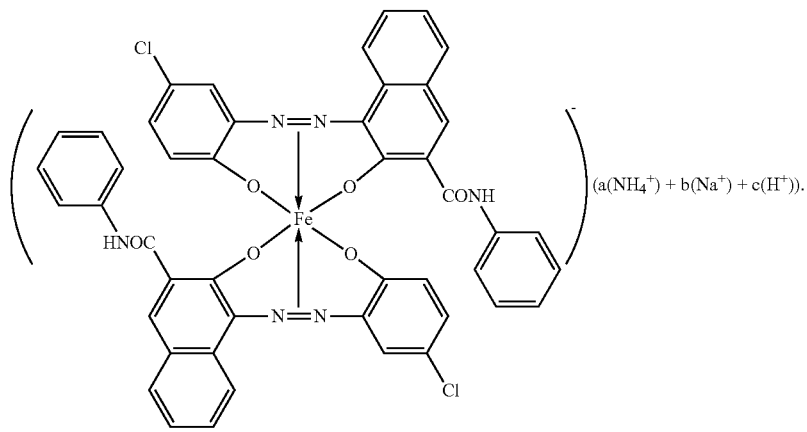

The quaternary ammonium salt used in the surface layer 3 may be a compound represented by Formula (2) below:

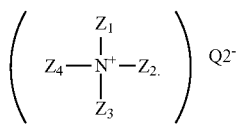

Formula (2)

In Formula (2) above, $Z_1$ to $Z_4$ each independently represents a substituted or unsubstituted alkyl group of 1 to 16 carbon atoms, for example, 1 to 12 carbon atoms or 1 to 6 carbon atoms (excluding carbon atoms in a substituent), a substituted or unsubstituted aryl group of 5 to 12 carbon atoms, for example, 6 to 12 carbon atoms (excluding carbon atoms in a substituent), or a monovalent group represented by —R—(O)$_n$—R'—OH (here, R and R' each independently represent a linear or branched alkylene group of 1 to 12 or 1 to 6 carbon atoms, and n is an integer of 0 or 1). The alkyl group and aryl group may each independently have a substituent, for example, a halogen group, a nitro group, a hydroxyl group, an organic acid group (for example, a sulfo group, or a carboxylic group). In the quaternary ammonium salt represented by Formula (2), when one or two of $Z_1$ to $Z_4$ is a substituent having a hydroxyl group such as —R—(O)$_n$—R'—OH, the quaternary ammonium salt may react with an isocyanate group in the step of synthesizing a urethane resin binder to be combined through a covalent bond with the urethane resin. Accordingly, in this case, while using the charging member, the phenomenon of contaminating the photoconductor by migration of a quaternary ammonium salt to the surface of the charging member may be suppressed. $Q_2^-$ represents any one monovalent anion selected from a monovalent anion derived from an organic sulfuric acid, a monovalent anion derived from an organic sulfonic acid, a monovalent anion derived from perchloric acid (i.e., perchlorate ion), a monovalent anion derived from an organic phosphoric acid, a monovalent anion derived from a fluorinated sulfonic acid, a monovalent anion derived from a fluorinated carboxylic acid, a monovalent anion derived from a fluorinated alkylfluoroboric acid, a monovalent anion derived from a fluorinated phosphoric acid, a monovalent anion derived from a fluorinated sulfonylimide, a halide anion, and a fluorinated sulfonylmethide anion. Specific examples of $Q_2^-$ may include $BF_4^-$, $PF_6^-$, $[N(SO_2CF_3)_2]^-$, $Cl^-$, $Br^-$, $ClO_4^-$, $CH_3CH_2SO_4^-$, a trifluoromethanesulfonylmethide anion, and a perfluoroethylsulfonylmethide anion. Specific compounds of the quaternary ammonium salt represented by Formula (2) may be compounds represented by Formulae (QA1) to (QA7) below:

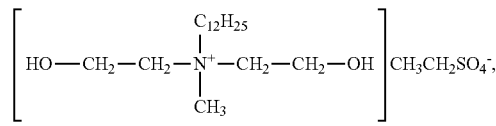

Formula (QA1)

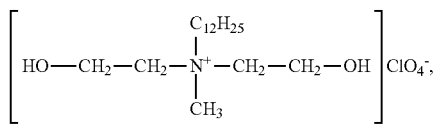

Formula (QA2)

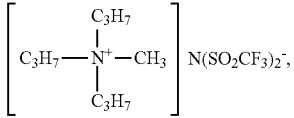

Formula (QA3)

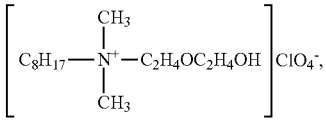

Formula (QA4)

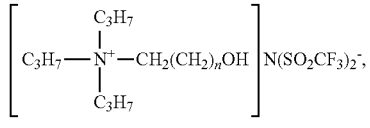

Formula (QA5)

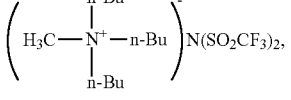

Formula (QA6)

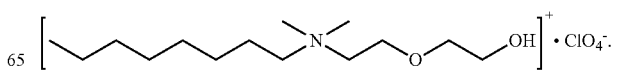

Formula (QA7)

The quaternary ammonium salt is added to the urethane binder resin together with the azo-based metal complex compound to be able to stably and uniformly charge the photoconductor in various environments by interaction. Accordingly, an electrophotographic image forming apparatus including such a charging member may provide a high-quality image free of image defects such as background and micro-jitter for a long period of time even when used in various environments.

The surface layer 3 may include electron-conducting agent particles, for example, electron-conducting agent particles usable in the above-disclosed elastic body layer 2, to adjust the resistance value of the surface layer 3. Specific examples of the electron-conducting agent particles include fine metal particles of aluminum, copper, nickel, silver, or the like; conductive metal oxide particles of antimony oxide, indium oxide, tin oxide, titanium oxide, zinc oxide, molybdenum oxide, or the like; crystalline graphite particles; carbon fibers; and carbon black particles. The surface layer 3 may include carbon black particles having excellent dispersibility and electrical conductivity, for example, oxidized carbon black particles, conductive carbon black particles, crystalline graphite particles, or the like, among the aforementioned particles. The average particle diameter of the electron-conducting agent particles may be about 15 nm or more from the viewpoint of dispersion stability, and may be about 10 μm to 30 μm from the viewpoint of resistance uniformity of the charging member 10.

In terms of suppressing a charge up phenomenon and reducing the electric resistance variation of the charging member 10 to enable the charging member to maintain a stable and uniform charging ability over a long period of time, the surface layer 3 may include about 2 to 10 parts by weight, for example, about 2 to 7.5 parts by weight, about 2 to 5 parts by weight, or about 3 to 5 parts by weight of the azo-based metal complex compound represented by Formula (1); about 0.5 to 5 parts by weight, for example, about 1 to 5 parts by weight, about 2 to 5 parts by weight, or about 2 to 4 parts by weight of the quaternary ammonium salt represented by Formula (2); and about 0.5 to 5 parts, for example, about 1 to 5 parts by weight, about 1 to 4 parts by weight, about 1 to 3 parts by weight or about 1 to 2 parts by weight of the electron-conducting agent, based on 100 parts by weight of the urethane resin.

The surface layer 3 may include a cured product of a resin composition containing a urethane binder resin, an azo-based metal complex compound, a quaternary ammonium salt, and an electron-conducting agent.

Further, in order to more stably charge the photoconductor 11, the surface layer 3 may include particles for forming roughness to form unevenness on the surface thereof. The particles for forming roughness may include organic particles or inorganic particles. For example, the organic particles may be one or more kinds of particles selected from acrylic resin particles such as polymethyl methacrylate (PMMA) and polymethyl acrylate (PMAA) particles, styrene resin particles, polyamide particles, silicone resin particles, vinyl chloride resin particles, vinylidene chloride resin particles, acrylonitrile resin particles, fluorine resin particles, phenol resin particles, polyester particles, melamine resin particles, urethane resin particles, olefin resin particles, and epoxy resin particles. The inorganic particles may be one or more kinds of particles selected from silica particles, alumina particles, or the like. For example, the surface layer 3 may include acrylic resin particles having an average particle diameter of about 10 μm to 40 μm, for example, about 15 μm to 30 μm or about 15 μm to 25 μm; and silica particles having an average particle diameter of about 3 μm to 15 μm, for example, about 3 μm to 10 μm. Since the surface layer 3 includes such particles, the wear resistance and the resistance to electrical deterioration of the charging member 10 may be increased, and the charging unevenness of the charging member 10 may be effectively suppressed, so that the charging performance of the charging roller 10 may be sufficiently maintained even when the charging roller 10 is used for a long time. Specific examples of the acrylic resin particles may include polymethyl methacrylate (PMMA) particles and/or polymethyl acrylate (PMAA) particles in terms of commercial availability and proper hardness. In the case of monodispersed acrylic resin particles, for example, monodispersed PMMA particles, unevenness or irregularity may be well formed on the surface of the surface layer 3, so that discharge points may be sufficiently secured, and thus charging characteristics are good. The reason for this is inferred that appropriate voids are formed in the nip of the contact portion between the photoconductor 11 and the charging roller 10 to improve charging performance. The spherical silica particles are non-agglomerated silica particles, and may include spherical silica particles, approximately spherical silica particles, and elliptic silica particles. The surface layer 3 may include about 1 to 20 parts by weight, for example, about 1 to 15 parts by weight or about 2 to 15 parts by weight of organic particles or inorganic particles, based on 100 parts by weight of the urethane resin.

Accordingly, the charging roller 10 according to an example may maintain the ability to uniformly charge the photoconductor 11 even when it is used in a contact charging method over a long period of time. Therefore, even when the charging roller 10 according to an example is used in an electrophotographic image forming apparatus for a long time, the charging roller 10 may maintain charging performance and charging uniformity, it is possible to stably obtain a high-quality image in which image defects such as background (BG) and micro jitter are suppressed. Moreover, the charging roller 10 according to an example may maintain stable charging characteristics over a long period of time even when a DC voltage is applied, may achieve a high-quality output image, and particularly may solve the BG symptom in low-temperature and low-humidity environments. The average particle diameter of the acrylic resin particles and the silica particles may be measured by a particle size distribution measuring device (manufacturer: Beckman Coulter, brand name: Multisizer 3).

The surface layer 3 may further include other additives such as a leveling agent, a filler, an antifoaming agent, a surface modifier, a dispersant, and a charge control agent.

For example, the thickness of the surface layer 3 may be about 1 μm to about 20 μm. When the thickness thereof is about 1 μm or greater, the resin particles and/or the inorganic particles to be added may be maintained without being detached from the surface layer 3 over a long period of time. When the thickness thereof is about 20 μm or less, it may maintain the charging performance satisfactorily. In this regard, the thickness of the surface layer 3 may be in a range of about 1 μm to about 15 μm, about 1 μm to about 10 μm, about 1 μm to about 8 μm, about 1 μm to about 7 μm, or about 1 μm to about 5 μm. Here, the thickness of the surface layer 3 may be a layer thickness of the portion formed by the binder resin alone. When the thickness of the surface layer 3 is less than about 1 μm, wear resistance is liable to decrease due to long-term use, and performance of suppressing a phenomenon in which unreacted crosslinking materials are bled out from the elastic body layer 2 to the surface layer may deteriorate. When the thickness of the surface layer 3 is more than about 20 μm, since the surface layer 3 may become hard or non-flexible, its durability may deteriorate, cracks may be generated on it by use, and the toner used may be damaged, so that the toner may stick to the photoconductor 11 or the cleaning blade, resulting in image defects. The thickness of the surface layer 3 may be measured by cutting out a charging roller cross section with a sharp blade and observing the piece with an optical microscope or an electron microscope.

According to an example a DC voltage may be applied to the charging roller 10. In particular, the bias voltage applied to the photoconductor during image output may be about −1500 V to about −1000 V. This makes it easier to control the image density and various conditions while maintaining the charging performance in various environments. For example, when the bias voltage is higher than about −1000 V, it becomes difficult to optimize the developing conditions for image formation. In contrast, when the bias voltage is lower than about −1500 V, over-discharge tends to occur in the particle portion of the surface layer 3, and white spot-like image defects tend to occur after image formation.

<Method of Manufacturing Charging Member>

The charging member according to an example, for example, as shown in FIG. 1, may be manufactured as follows. That is, components of the materials for the elastic body layer 2 are kneaded using a kneader to prepare materials for the elastic body layer 2. The materials for the surface layer 3 are kneaded using a kneader such as a roll to obtain a mixture, and an organic solvent is added to this mixture, mixed and stirred, thereby preparing a coating liquid for the surface layer 3. Next, a mold for injection molding, which is provided with a core (usually a shaft) serving as the conductive support 1 therein, is filled with the materials for the elastic body layer 2 by injecting the materials, followed by heating and crosslinking under predetermined conditions. Then, demolding is performed to a base roll in which the elastic body layer 2 is formed along the outer circumference surface of the conductive support 1. Next, the coating liquid for the surface layer 3 is applied onto the outer circumference surface of the base roll to form the surface layer 3. In this way, a charging roller 10 in which the elastic body layer 2 is formed on the outer circumference surface of the conductive support 1 and the surface layer 3 is formed on the outer circumference of the elastic body layer 2 may be manufactured.

However, the method of forming the elastic body layer 2 is not limited to injection molding, and casting, press molding, polishing, or a combination thereof may be employed. The method of applying the coating liquid for the surface layer 3 may include dipping, spray coating, and roll coating, other various types of methods.

<Electrophotographic Image Forming Apparatus>

The charging roller 10 according to an example may be integrated into an electrophotographic cartridge or an electrophotographic imaging apparatus such as a laser printer, a copier, or a fax machine.

The electrophotographic imaging apparatus according to an example may include: an electrophotographic photoconductor; a charging member or unit according to an example contacting to or spaced apart from the electrophotographic photoconductor to charge the electrophotographic photoconductor; an exposure unit forming an electrostatic latent image on the surface of the electrophotographic photoconductor; a developing unit developing the electrostatic latent image to form a visible image; a transfer unit transferring the visible image onto an image receiving member; and a cleaning unit cleaning the surface of the electrophotographic photoconductor after transferring the visible image.

The electrophotographic cartridge according to an example may integrally support an electrophotographic photoconductor, a charging member or unit according to an example contacting to or spaced apart from the electrophotographic photoconductor to charge the electrophotographic photoconductor; or at least one selected from a developing unit developing an electrostatic latent image formed on the electrophotographic photoconductor to form a visible image and a cleaning unit cleaning the surface of the electrophotographic photoconductor after transferring. The electrophotographic cartridge may be attached to the electrophotographic imaging apparatus, and may be detached from the electrophotographic imaging apparatus. For example, the electrophotographic cartridge according to an example may integrally support an electrophotographic photoconductor, a charging member or unit according to an example of thedisclosure contacting to or spaced apart from the electrophotographic photoconductor to charge the electrophotographic photoconductor, and a cleaning unit cleaning the surface of the electrophotographic photoconductor after transferring, and may be attached to and detached from the electrophotographic imaging apparatus.

Figure 2:
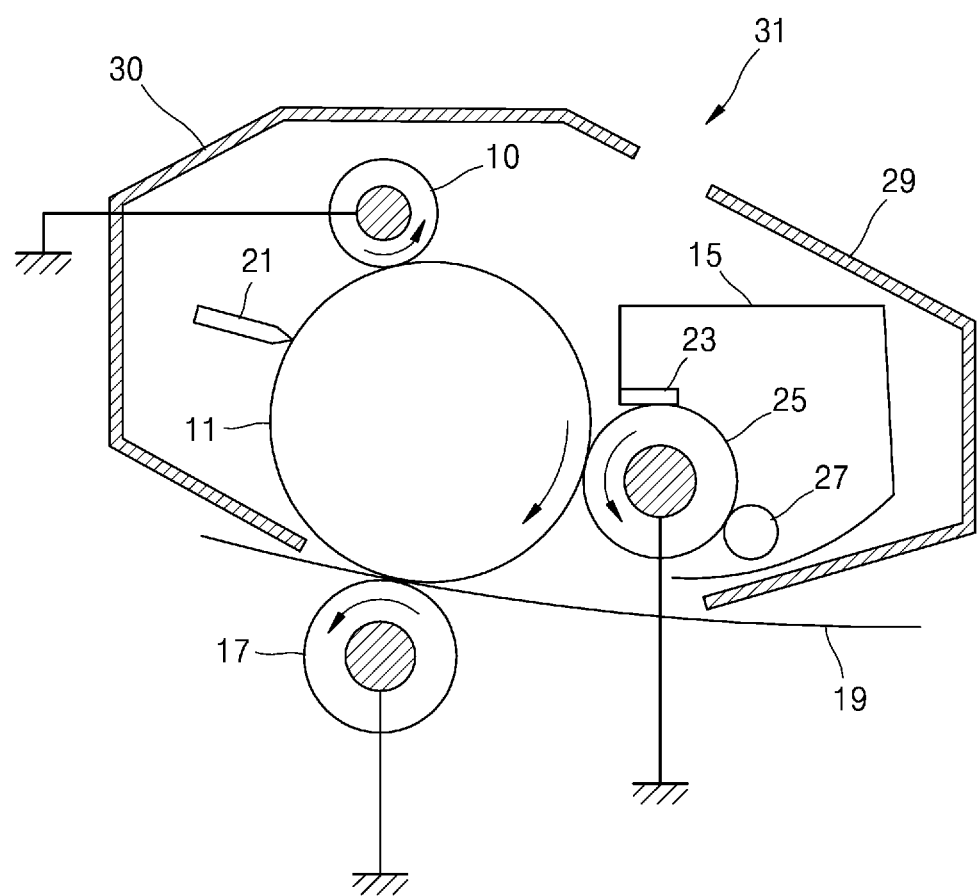
FIG. 2 is a cross-sectional view schematically illustrating an electrophotographic imaging apparatus and an electrophotographic cartridge including the charging roller according to an example.

FIG. 2 is a cross-sectional view schematically illustrating an electrophotographic imaging apparatus and an electrophotographic cartridge including the charging roller according to an example.

Referring to FIG. 2, an electrophotographic photoconductor drum 11 is charged by a charging roller 10 according to an example, which is a charging means disposed in contact with the photoconductor drum 11. The electrophotographic photosensitive member 11 is rotationally driven at a predetermined circumferential speed about its longitudinal axis. The electrophotographic photoconductor 11 is subjected to uniform charging of positive or negative predetermined potential on its surface by the charging roller 10 in the rotation process. The voltage applied to the charging roller 10 may be, for example, a DC voltage. However, the voltage applied to the charging roller 10 may be, for example, a combination of an AC voltage and a DC voltage. In the electrophotographic imaging apparatus 31 according to an example, even when a DC voltage is applied to the charging roller 10, stable charging characteristics may be maintained for a longer period of time, and a high-quality output image may be obtained The charging roller 10 may charge the surface of the photoconductor 11 to a uniform potential value while rotating in contact with the photoconductor 11. Subsequently, the image portion is exposed by laser light to form an electrostatic latent image on the electrographic photoconductor drum 11. After the electrostatic latent image is made a visible image, for example, a toner image, by the developing unit 15, the toner image is transferred to an image receiving member 19 such as paper by the transfer roller 17 to which a voltage is applied. The toner remaining on the surface of the electrophotographic photoconductor drum 11 after the image transfer is cleaned by the cleaning unit, for example, a cleaning blade 21. Subsequently, the electrophotographic photoconductor drum 11 may be used again for image formation. The developing unit 15 includes a regulating blade 23, a developing roller 25, and a supply roller 27.

The electrophotographic cartridge 30 according to an example may integrally support the electrophotographic photoconductor drum 11, the charging unit 10, and the cleaning unit 21, and may be attached to and detached from the electrophotographic imaging apparatus 31. Another electrophotographic cartridge 30 may integrally support the developing unit 15 including the regulating blade 23, the developing roller 25, and the supply roller 27, and may be attached to and detached from the electrophotographic imaging apparatus 31. Toner (not shown) is located inside the developing unit 15.

EXAMPLES

Hereinafter, thedisclosure will be described in more detail with reference to examples. However, the following examples are merely presented to exemplify the disclosure, and the scope of the disclosure is not limited thereto.

<Formation of Conductive Elastic Body Layer 2>

An adhesive was applied to a cylindrical stainless-steel shaft having a diameter of 8 mm and a total length of 324 mm (the surface thereof was electroless plated with nickel) and was dried. This shaft was used as a support. 100 parts by weight of epichlorohydrin rubber (Manufacturer: Daiso Chemical Co., Ltd., product name: EPICHLOMER DG), 20 parts by weight of calcium carbonate, 2 parts by weight of carbon black (Manufacturer: Mitsubishi Chemical Corporation, product name: MA100) as a filler, 5 parts by weight of zinc oxide, and 2 parts by weight of tetrabutylammonium chloride as an ion-conducting agent were put into a hermetic mixer and kneaded for 20 minutes, and then 1.5 parts by weight of dibenzothiazyl disulfide as a vulcanization accelerator, 1.2 parts by weight of dipentamethylene thiuram tetrasulfide, and 1.0 part by weight of sulfur as a crosslinking agent were further added thereto and kneaded in an open roll for about 15 minutes to obtain a rubber composition. This rubber composition was extruded together with the shaft using a crosshead rubber extruder to be formed into a roller shape having an outer diameter of about 13 mm. Next, after a vulcanization process was performed in a vulcanization tube at about 160° C. for about 1.5 hours, both ends of the rubber were cut, the surface of the rubber was polished such that the outer diameter of the center portion of the roller became about 12 mm, and then the surface thereof was washed, dried and then irradiated with ultraviolet light to form a conductive elastic body layer 2. Thus, a conductive elastic body layer 2 having a thickness of about 4 mm and formed along the outer circumference surface of the shaft was obtained.

<Formation of Conductive Surface Layer 3>

Examples 1 to 8 and Comparative Examples 1 to 4

69.26 parts by weight of a polycaprolactone polyol (Manufacturer: Daicel Chemical Industries, product name: PCL320, hydroxyl value: 84 KOH mg/g), 51.24 parts by weight of isocyanate-type blocked HDI (Manufacturer: Aekyung Chemical Co., Ltd., product name: D660, non-volatile matter 60%, NCO 6.5%, blocking agent: methyl ethyl ketone oxime), 1 part by weight of a polymer dispersant (Manufacturer: Lubrizol Co., Ltd., product name: SOLSPERSE™ 20000), 1 part by weight of carbon black (Manufacturer: Mitsubishi Chemical Corporation, product name: MA100, specific surface area: 110 $m^2$/g, pH 3.5), 2 parts by weight of hydrophobic fumed silica (Manufacturer: Evonik Resource Efficiency GmbH, trade name: AEROSIL R 974, specific surface area: 110 $m^2$/g), 10 parts by weight of monodispersed crosslinked PMMA resin particles having an average particle diameter of 20 μm (Manufacturer: Sekisui Plastics, product name: SSX-120), and 0.1 parts by weight of silicone oil (Manufacturer: ShinEtsu Chemical Co., Ltd., product name: KF6002) were mixed with 200 parts by weight of a methyl isobutyl ketone (MIBK) solvent. Then, an azo-based metal complex compound and a quaternary ammonium salt whose added amounts are given in Tables 1 and 2 according to Examples and Comparative Examples were further added thereto, and the resulting mixture were sufficiently stirred until the coating liquid became uniform to prepare a coating liquid for forming the surface layer 3.

The coating liquid for forming the surface layer 3 was applied to the surface of the roller having the conductive elastic body layer 2 by a roll coating method. In this case, in order to obtain an anticipated layer thickness, coating was performed while scraping off excess coating liquid with a scraper. The coated roller was air-dried for about 10 minutes and then dried at 160° C. for about 1 hour using an oven. Thus, a charging roller in which the conductive surface layer 3 having a thickness of about 1.0 μm is laminated on the conductive elastic body layer 2 was obtained. Thus, a charging roller 10 including the shaft, which is the conductive support 1, the conductive elastic body layer 2 laminated along the outer circumference surface of the shaft, and the conductive surface layer 3 laminated along the outer circumference surface of the conductive elastic body layer 2 was prepared.

The types and added amounts of the azo-based metal complex compound (indicated as 'AZO complex') and the quaternary ammonium salt used in Examples 1 to 8 and Comparative Examples 1 to 4 are summarized in Tables 1 and 2. The evaluation results of the charging roller are also summarized in Tables 1 and 2. In Tables 1 and 2 below, 'Ex', 'CE' and 'pbw' mean example, comparative example and parts by weight, respectively.

TABLE 1

|  |  | Ex 1 | Ex 2 | Ex 3 | Ex 4 | Ex 5 | Ex 6 | Ex 7 |
|---|---|---|---|---|---|---|---|---|
| AZO | AZO-1 | 5 | — | — | — | — | — | — |
| complex | AZO-2 | — | 5 | — | — | — | — | — |
| (pbw) | AZO-3 | — | — | 5 | 5 | 5 | 5 | 5 |
| Quaternary | QA1 | 2 | 2 | 2 | — | — | — | — |
| ammonium | QA2 | — | — | — | 2 | — | — | — |
| salt | QA3 | — | — | — | — | 2 | — | — |
| (pbw) | QA4 | — | — | — | — | — | 2 | — |
|  | QA5 | — | — | — | — | — | — | 2 |
| Surface resistance (Ohm/□) |  | 1.45E+07 | 2.58E+07 | 3.27E+07 | 4.27E+07 | 3.34E+07 | 5.27E+07 | 3.27E+07 |

TABLE 1-continued

|  |  | Ex 1 | Ex 2 | Ex 3 | Ex 4 | Ex 5 | Ex 6 | Ex 7 |
|---|---|---|---|---|---|---|---|---|
| Volume resistance (Ohm · cm) | | 2.14E+05 | 1.15E+05 | 3.33E+05 | 5.17E+05 | 3.00E+05 | 6.00E+05 | 3.16E+05 |
| L/L | B/G | A | A | A | A | A | A | A |
|  | M/J | A | A | A | A | B | A | A |
| H/H | M/J | A | A | A | A | B | B | A |

TABLE 2

|  |  | Ex 8 | CE 1 | CE 2 | CE 3 | CE 4 |
|---|---|---|---|---|---|---|
| AZO complex (pbw) | AZO-1 | — | — | — | 5 | 10 |
|  | AZO-2 | — | — | — | — | — |
|  | AZO-3 | 5 | — | — | — | — |
| Quaternary ammonium salt (pbw) | QA1 | 5 | 2 | — | — | — |
|  | QA2 | — | — | — | — | — |
|  | QA3 | — | — | 2 | — | — |
|  | QA4 | — | — | — | — | — |
|  | QA5 | — | — | — | — | — |
| Surface resistance (Ohm/□) | | 6.91E+06 | 9.80E+06 | 1.45E+07 | 1.41E+10 | 2.64E+10 |
| Volume resistance (Ohm · cm) | | 7.95E+04 | 9.38E+04 | 1.11E+05 | 1.20E+06 | 2.34E+06 |
| L/L | B/G | A | A | B | C | C |
|  | M/J | A | C | C | D | D |
| H/H | M/J | B | B | B | C | C |

Measurement of Surface Resistance and Volume Resistance

The charging rollers obtained in Examples 1 to 8 and Comparative Examples 1 to 4 were left for 24 hours in an environment of a temperature of 23° C. and a relative humidity of 50%. Subsequently, a UR-SS probe of a resistance measuring device (Manufacturer: MITSUBISHI CHEMICAL ANALYTECH Co., Ltd., product name: Hiresta-UX MCP-HT800) was in contact with the surface of the charging roller under the condition of an applied voltage of 250 V and applied time of 10 seconds to respectively measure surface resistance and volume resistance three times. The average value of the measured surface resistance values was determined as a surface resistance (unit: Ω/□) of the charging roller, and the average value of the measured volume resistance values was determined as a volume resistance (unit: Ω•cm) of the charging roller. The measurement was carried out in an environment of a temperature 23° C. and a relative humidity of 53%.

Image Evaluation

<Image Evaluation Under L/L Environmental Conditions (Temperature of 15□° C. and Relative Humidity of 10%)>

Image evaluations in the case of using the charging rollers obtained in Examples 1 to 8 and Comparative Examples 1 to 4 were carried out as follows. After removing the charging roller from a commercially available laser printer (Manufacturer: HP Co., Ltd., Model name: HP JADE 30PPM Color LaserJet A3), each of the charging rollers obtained in Examples 1 to 8 and Comparative Examples 1 to 6 was mounted thereon instead of the above charging roller. The printer was left for 24 hours under L/L environmental conditions (temperature 15° C. and relative humidity 10%). After 10,000 sheets of 2% printed images were output using this printer, one sheet of a solid white image was output on gloss paper. When the average value of reflection density values of the output solid white image measured at 16 points (center points of 16 sections obtained by vertically and evenly dividing the gloss paper into four parts and horizontally and evenly dividing the glass paper into four parts) was set as Ds (%) and the average value of reflection density values of the gloss paper prior to outputting the solid white image measured at 16 points was set as Dr (%), the difference Ds–Dr between Ds and Dr was set as an amount of background (B/G). The reflection density was measured using a reflection densitometer (Manufacturer: Tokyo Denshoku Co., Ltd., Product name: White Photometer TC-6DS/A). Background (B/G) properties of the images were evaluated based on the following criteria.

A: when the amount of background is less than 2%,

B: when the amount of background is 2% or more and less than 4%,

C: when the amount of background is 4% or more.

<Image Evaluation Under L/L Environmental Conditions (Temperature of 15° C. and Relative Humidity of 10%) and H/H Environmental Conditions (Temperature of 30° C. and Relative Humidity of 80%)>

Image evaluations in the case of using the charging rollers obtained in Examples 1 to 8 and Comparative Examples 1 to 4 were carried out as follows. After removing the charging roller from a commercially available laser printer (Manufacturer: HP Co., Ltd., Model name: HP JADE 30PPM Color LaserJet A3), each of the charging rollers obtained in Examples 1 to 8 and Comparative Examples 1 to 6 was mounted thereon instead of the above charging roller. The printer was left for 24 hours under L/L environmental conditions (temperature 15° C. and relative humidity 10%). Images were output using this printer. As image output conditions for this evaluation an image printed randomly on 1 area % of an image forming area was used, the printer was stopped when one sheet of the image was output, and image forming operation was repeated after 10 seconds. Based on this conditions, durability tests of 30,000 sheets of output images were carried out. Thereafter, an electrophotographic image for microjitter (M/J) evaluation was formed. The electrophotographic image for evaluation is a half-tone image (a medium-concentration image having horizontal stripes of a width of 1 dot and an interval of 2 dots in a direction perpendicular to the rotational direction of the photoconductor). This image was observed, and the presence or absence and degree of fine horizontal stripes (microjitter (M/J)) were evaluated according to the following criteria. After the printer was left under H/H conditions (temperature 30° C. and relative humidity 80%) for 24 hours, the existence and degree of microjitter (M/J) were evaluated according to the above-disclosed procedures.

A: micro-jitter does not appear on the image at all

B: micro-jitter appears slightly on a part of the image, but there is no practical defect.

C: micro-jitter appears slightly on the entire surface of the image, but is within the usable range, D: micro-jitter appears clearly on the entire surface of the image, and thus there is a practical defect.

Referring to Tables 1 and 2, it may be found that the image forming apparatus mounted with the charging rollers of Examples 1 to 8 each provided with the surface layer 3 including an electron-conducting agent and a combination of an azo-based metal complex compound represented by Formula (1) and a quaternary ammonium salt represented by Formula (2) in a urethane resin may stably output a high-quality image free of image defects such as background (BIG) and microjitter (M/J) even when used for a long period of time in different usable environments from a low-temperature low-humidity environment atmosphere to a high-temperature high-humidity environment atmosphere, as compared with the image forming apparatus mounted with the charging rollers of Comparative Examples 1 to 4 each provided with the surface layer 3 including an electron-conducting agent and any one of an azo-based metal complex compound represented by Formula (1) and a quaternary ammonium salt represented by Formula (2) in a urethane resin. The reason for this is that the charging rollers of Examples 1 to 8 may maintain stable and uniform charging characteristics even when they are used in differemt usable environments from a low-temperature low-humidity environment atmosphere to a high-temperature high-humidity environment atmosphere.

What is claimed is:

1. A charging member for an electrophotographic image forming apparatus, the charging member comprising:
    a surface layer formed on a conductive elastic body layer formed on a conductive support, wherein
    the conductive elastic body layer includes a conducting agent;
    the surface layer includes a urethane resin, an electron conducting agent, an azo-based metal complex compound, and a quaternary ammonium salt, and
    the azo-based metal complex compound is represented by Formula (1) below:

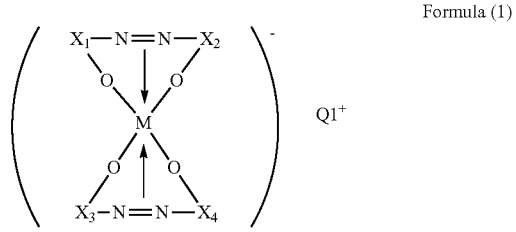

Formula (1)

where $X_1$, $X_2$, $X_3$, and $X_4$ each independently represent a substituted or unsubstituted phenylene group, a substituted or unsubstituted naphthalenylene group, or a substituted or unsubstituted pyrazolenylene group, M represents Fe, Cr, or Al, and $Q1^+$ represents a monovalent cation.

2. The charging member of claim 1, wherein the quaternary ammonium salt is represented by Formula (2) below:

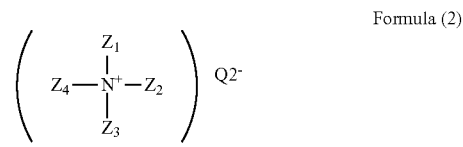

Formula (2)

where $Z_1$ to $Z_4$ each independently represent a substituted or unsubstituted alkyl group of 1 to 16 carbon atoms excluding carbon atoms in a substituent, a substituted or unsubstituted aryl group of 5 to 12 carbon atoms excluding carbon atoms in a substituent, or a monovalent group represented by $-R-(O)_n-R'-OH$, R and R' each independently representing a linear or branched alkylene group of 1 to 12 carbon atoms, n being 0 or 1; and where $Q2^-$ represents any one monovalent anion selected from a monovalent anion derived from an organic sulfuric acid, a monovalent anion derived from an organic sulfonic acid, perchlorate ion, a monovalent anion derived from an organic phosphoric acid, a monovalent anion derived from a fluorinated sulfonic acid, a monovalent anion derived from a fluorinated carboxylic acid, a monovalent anion derived from a fluorinated alkylfluoroboric acid, a monovalent anion derived from a fluorinated phosphoric acid, a monovalent anion derived from a fluorinated sulfonylimide, a halide anion, and a fluorinated sulfonylmethide anion.

3. The charging member of claim 2, wherein, in the quaternary ammonium salt represented by Formula (2), one among $Z_1$ to $Z_4$ includes a hydroxyl group as a substituent.

4. The charging member of claim 1, wherein the surface layer includes 2 to 10 parts, by weight, of the azo-based metal complex compound, 0.5 to 5 parts, by weight, of the quaternary ammonium salt, and 0.5 to 5 parts, by weight, of the electron conducting agent, based on 100 parts, by weight, of the urethane resin.

5. The charging member of claim 1, wherein the electron-conducting agent includes one selected from carbon black and graphite.

6. The charging member of claim 1, wherein the conductive support is a roller.

7. A cartridge for an electrophotographic image forming apparatus, the cartridge being attachable to and detachable from an electrophotographic image forming apparatus, the cartridge comprising:
    a charging member, wherein
    the charging member includes a conductive elastic body layer and a surface layer formed on the conductive elastic body layer;
    the conductive elastic body layer includes a conducting agent, and
    the surface layer includes a urethane resin, an electron conducting agent, an azo-based metal complex compound, and a quaternary ammonium salt, and the azo-based metal complex compound is represented by Formula (1) below:

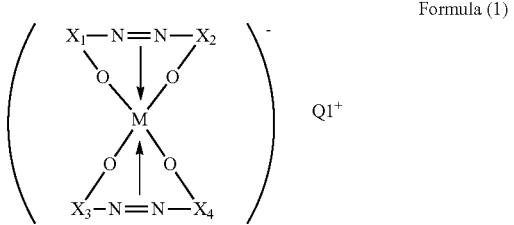

Formula (1)

where $X_1$, $X_2$, $X_3$, and $X_4$ each independently represent a substituted or unsubstituted phenylene group, a substituted or unsubstituted naphthalenylene group, or a substituted or unsubstituted pyrazolenylene group, M represents Fe, Cr, or Al, and $Q1^+$ represents a monovalent cation.

8. The cartridge of claim 7, wherein the quaternary ammonium salt is represented by Formula (2) below:

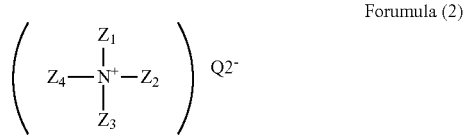

Forumula (2)

where $Z_1$ to $Z_4$ each independently represent a substituted or unsubstituted alkyl group of 1 to 16 carbon atoms excluding carbon atoms in a substituent, a substituted or unsubstituted aryl group of 5 to 12 carbon atoms excluding carbon atoms in a substituent, or a monovalent group represented by —R—(O)$_n$—R'—OH, R and R' each independently representing a linear or branched alkylene group of 1 to 12 carbon atoms, and n being 0 or 1; and where $Q2^-$ represents any one monovalent anion selected from a monovalent anion derived from an organic sulfuric acid, a monovalent anion derived from an organic sulfonic acid, perchlorate ion, a monovalent anion derived from an organic phosphoric acid, a monovalent anion derived from a fluorinated sulfonic acid, a monovalent anion derived from a fluorinated carboxylic acid, a monovalent anion derived from a fluorinated alkylfluoroboric acid, a monovalent anion derived from a fluorinated phosphoric acid, a monovalent anion derived from a fluorinated sulfonylimide, a halide anion, and a fluorinated sulfonylmethide anion.

9. The cartridge of claim 8, wherein, in the quaternary ammonium salt represented by Formula (2), one among $Z_1$ to $Z_4$ includes a hydroxyl group as a substituent.

10. The cartridge of claim 7, wherein the electron-conducting agent includes one selected from carbon black and graphite.

11. The cartridge of claim 7, wherein the charging member is a roller.

12. An electrophotographic image forming apparatus comprising:
a charging member, wherein
the charging member includes a conductive elastic body layer and a surface layer formed on the conductive elastic body layer;
the conductive elastic body layer includes a conducting agent, and
the surface layer includes a urethane resin, an electron conducting agent, an azo-based metal complex compound, and a quaternary ammonium salt, and the azo-based metal complex compound is represented by Formula (1) below:

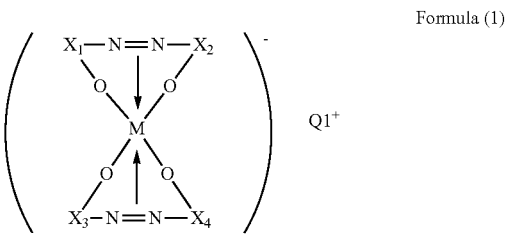

Formula (1)

where X1, X2, X3, and X4 each independently represent a substituted or unsubstituted phenylene group, a substituted or unsubstituted naphthalenylene group, or a substituted or unsubstituted pyrazolenylene group, M represents Fe, Cr, or Al, and Q1+ represents a monovalent cation.

13. The electrophotographic image forming apparatus of claim 12, wherein the quaternary ammonium salt is represented by Formula (2) below:

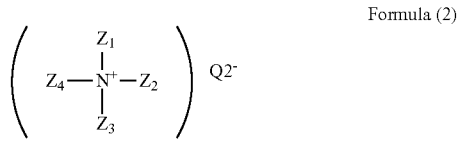

Formula (2)

where $Z_1$ to $Z_4$ each independently represent a substituted or unsubstituted alkyl group of 1 to 16 carbon atoms excluding carbon atoms in a substituent, a substituted or unsubstituted aryl group of 5 to 12 carbon atoms excluding carbon atoms in a substituent, or a monovalent group represented by —R—(O)$_n$—R'—OH, R and R' each independently representing a linear or branched alkylene group of 1 to 12 carbon atoms, and n being 0 or 1; and where $Q2^-$ represents any one monovalent anion selected from a monovalent anion derived from an organic sulfuric acid, a monovalent anion derived from an organic sulfonic acid, perchlorate ion, a monovalent anion derived from an organic phosphoric acid, a monovalent anion derived from a fluorinated sulfonic acid, a monovalent anion derived from a fluorinated carboxylic acid, a monovalent anion derived from a fluorinated alkylfluoroboric acid, a monovalent anion derived from a fluorinated phosphoric acid, a monovalent anion derived from a fluorinated sulfonylimide, a halide anion, and a fluorinated sulfonylmethide anion.

14. The electrophotographic image forming apparatus of claim 13, wherein, in the quaternary ammonium salt represented by Formula (2), one among $Z_1$ to $Z_4$ includes a hydroxyl group as a substituent.

15. The electrophotographic image forming apparatus of claim 12, wherein the charging member is a charging roller.

* * * * *